US012493297B2

(12) United States Patent
Ord et al.

(10) Patent No.: US 12,493,297 B2
(45) Date of Patent: Dec. 9, 2025

(54) MOBILE ROBOT AND METHOD OF CONTROLLING THEREOF

(71) Applicant: Dyson Technology Limited, Wiltshire (GB)

(72) Inventors: Christopher John Ord, Bath (GB); James Robert Carswell, Bristol (GB); Giles Ashbee, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 911 days.

(21) Appl. No.: 17/266,018

(22) PCT Filed: Jun. 12, 2019

(86) PCT No.: PCT/GB2019/051630
§ 371 (c)(1),
(2) Date: Feb. 4, 2021

(87) PCT Pub. No.: WO2020/030884
PCT Pub. Date: Feb. 13, 2020

(65) Prior Publication Data
US 2022/0091615 A1    Mar. 24, 2022

(30) Foreign Application Priority Data

Aug. 6, 2018 (GB) ..................... 1812785

(51) Int. Cl.
*G05D 1/00* (2024.01)
*A47L 9/00* (2006.01)
*A47L 9/28* (2006.01)

(52) U.S. Cl.
CPC ............ *G05D 1/0274* (2013.01); *A47L 9/009* (2013.01); *A47L 9/2805* (2013.01); *A47L 9/2852* (2013.01);
(Continued)

(58) Field of Classification Search
CPC .... G05D 1/0274; G05D 1/0214; G05D 1/027; A47L 9/009; A47L 9/2805; A47L 9/2852; A47L 2201/04
See application file for complete search history.

(56) References Cited

U.S. PATENT DOCUMENTS 6,459,955 B1    10/2002   Bartsch et al.
6,667,592 B2    12/2003   Jacobs et al.
(Continued)

FOREIGN PATENT DOCUMENTS

AU    2016216750 B2    8/2016
CN    105813528 A      7/2016
(Continued)

OTHER PUBLICATIONS

"Rankin, A; et al.; Driving Curiosity: Mars Rover Mobility Trends During the First Seven Years; 2020; Jet Propulsion Laboratory, California Institute of Technology" (Year: 2020).*
(Continued)

*Primary Examiner* — Russell Frejd
*Assistant Examiner* — Christopher R Cardimino
(74) *Attorney, Agent, or Firm* — Tucker Ellis LLP; Michael G. Craig

(57) ABSTRACT

A method of controlling a mobile robot capable of carrying out an operation within an environment, the method including: storing an environment map in a memory, the environment map including data to enable the robot to navigate the environment; further storing in the memory data corresponding to one or more hazard areas encountered by the mobile robot during previous operations; and reducing a tilt threshold of the robot when the mobile robot is navigating within an area of the environment that corresponds to a previously encountered hazard area.

20 Claims, 5 Drawing Sheets

(52) U.S. Cl.
CPC .......... *G05D 1/0214* (2013.01); *G05D 1/027* (2013.01); *A47L 2201/04* (2013.01)

(56) References Cited

U.S. PATENT DOCUMENTS

| | | | |
|---|---|---|---|
| 7,113,847 B2 | 9/2006 | Chmura et al. | |
| 7,916,931 B2 | 3/2011 | Lee et al. | |
| 8,019,514 B2* | 9/2011 | Yuet | B60T 7/12 |
| | | | 701/1 |
| 8,060,254 B2 | 11/2011 | Myeong et al. | |
| 8,463,436 B2 | 6/2013 | Jeong et al. | |
| 8,594,840 B1 | 11/2013 | Chiappetta et al. | |
| 8,843,245 B2 | 9/2014 | Choe et al. | |
| 8,869,342 B2 | 10/2014 | Yoon et al. | |
| 8,903,590 B2 | 12/2014 | Jeon | |
| 8,983,661 B2 | 3/2015 | Cho et al. | |
| 9,037,296 B2 | 5/2015 | Choe et al. | |
| 9,125,539 B2 | 9/2015 | Kim et al. | |
| 9,149,167 B2 | 10/2015 | Hong et al. | |
| 9,259,129 B2 | 2/2016 | Jang et al. | |
| 9,283,670 B2 | 3/2016 | Sun et al. | |
| 9,339,163 B2 | 5/2016 | Noh et al. | |
| 9,364,128 B2 | 6/2016 | Kim et al. | |
| 9,408,514 B1 | 8/2016 | Alexander et al. | |
| 9,423,797 B2 | 8/2016 | Lee et al. | |
| 9,452,526 B2 | 9/2016 | Jeong et al. | |
| 9,457,471 B2* | 10/2016 | Schnittman | B25J 9/1694 |
| 9,480,379 B2 | 11/2016 | Yoon et al. | |
| 9,483,055 B2 | 11/2016 | Johnson et al. | |
| 9,519,289 B2 | 12/2016 | Munich et al. | |
| 9,750,382 B2 | 9/2017 | Kim et al. | |
| 9,804,598 B2 | 10/2017 | Yoshino | |
| 9,931,009 B2* | 4/2018 | Miyake | A47L 9/2826 |
| 9,931,011 B2* | 4/2018 | Kim | A47L 11/283 |
| 10,474,153 B2* | 11/2019 | Matsuzaki | G05D 1/0214 |
| 11,274,931 B2* | 3/2022 | Hiramatsu | G05D 1/228 |
| 2005/0166354 A1 | 8/2005 | Uehigashi | |
| 2005/0166357 A1 | 8/2005 | Uehigashi | |
| 2005/0171639 A1 | 8/2005 | Uehigashi et al. | |
| 2006/0123582 A1 | 6/2006 | Tani | |
| 2006/0241827 A1 | 10/2006 | Fukuchi et al. | |
| 2009/0048727 A1 | 2/2009 | Hong et al. | |
| 2014/0075689 A1 | 3/2014 | Windorfer | |
| 2014/0283326 A1 | 9/2014 | Song et al. | |
| 2015/0197012 A1 | 7/2015 | Schnittman et al. | |
| 2015/0223659 A1 | 8/2015 | Han et al. | |
| 2016/0353959 A1 | 12/2016 | Lindh éet al. | |
| 2017/0031366 A1* | 2/2017 | Shamlian | G01B 11/026 |
| 2017/0071436 A1 | 3/2017 | Hofner et al. | |
| 2017/0131721 A1 | 5/2017 | Kwak et al. | |
| 2017/0176997 A1 | 6/2017 | Narikawa | |
| 2017/0197315 A1 | 7/2017 | Haegermarck | |
| 2017/0203439 A1 | 7/2017 | Shin et al. | |
| 2017/0265703 A1 | 9/2017 | Park et al. | |
| 2017/0273527 A1 | 9/2017 | Han et al. | |
| 2017/0325647 A1 | 11/2017 | Kwak | |
| 2017/0332866 A1 | 11/2017 | Nam et al. | |
| 2017/0336796 A1 | 11/2017 | Jun et al. | |
| 2017/0344013 A1 | 11/2017 | Haegermarck et al. | |
| 2018/0024563 A1 | 1/2018 | Matsuzaki et al. | |
| 2018/0120852 A1 | 5/2018 | Cho | |
| 2018/0348783 A1 | 12/2018 | Pitzer et al. | |
| 2019/0061157 A1* | 2/2019 | Suvarna | G05D 1/0274 |
| 2020/0116501 A1 | 4/2020 | Wu et al. | |
| 2020/0198139 A1 | 6/2020 | Qian et al. | |
| 2020/0397207 A1* | 12/2020 | Shin | A47L 11/4066 |
| 2022/0410856 A1* | 12/2022 | Wink | B60T 8/17551 |

FOREIGN PATENT DOCUMENTS

| | | | | |
|---|---|---|---|---|
| CN | 105899112 A | 8/2016 | | |
| CN | 106200645 A | 12/2016 | | |
| CN | 106527424 A | 3/2017 | | |
| CN | 107314773 A | 11/2017 | | |
| CN | 107368071 A | 11/2017 | | |
| CN | 107632599 A | 1/2018 | | |
| CN | 107728616 A | 2/2018 | | |
| CN | 108078503 A | 5/2018 | | |
| CN | 108303101 A | 7/2018 | | |
| DE | 102015119865 A1 | 5/2017 | | |
| EP | 2506106 A1 | 10/2012 | | |
| EP | 2258247 B1 | 3/2015 | | |
| EP | 2898962 A1 | 7/2015 | | |
| EP | 2921095 A1 | 9/2015 | | |
| EP | 2508957 B1 | 2/2016 | | |
| EP | 3272195 A1 | 1/2018 | | |
| EP | 3076845 B1 * | 2/2019 | .......... A47L 11/4072 | |
| GB | 2394795 B | 10/2004 | | |
| GB | 2570239 A | 7/2019 | | |
| JP | 2004-33340 A | 2/2004 | | |
| JP | 2005025501 A * | 1/2005 | | |
| JP | 2005-204872 A | 8/2005 | | |
| JP | 3841220 B2 | 8/2006 | | |
| JP | 2006-239844 A | 9/2006 | | |
| JP | 4157731 B2 | 10/2008 | | |
| JP | 2010-282443 A | 12/2010 | | |
| JP | 2017-502372 A | 1/2017 | | |
| JP | 2018-013833 A | 1/2018 | | |
| JP | 2018-077685 A | 5/2018 | | |
| KR | 10-0645815 B1 | 11/2006 | | |
| KR | 10-1798045 B1 | 11/2017 | | |
| KR | 20180085589 A * | 7/2018 | .......... A47L 9/2805 | |
| WO | 2011/064821 A1 | 6/2011 | | |
| WO | 2015/090405 A1 | 6/2015 | | |
| WO | 2016/161097 A1 | 10/2016 | | |
| WO | 2016/198822 A1 | 12/2016 | | |

OTHER PUBLICATIONS

"Adam, M. S.; Larsen, M.; Jensen, K.; Schultz, U. P.; Rule-based Dynamic Safety Monitoring for Mobile Robots; 2016; Journal of Software Engineering for Robotics, 7(1), 120-141" (Year: 2016).*

Office Action and Search Report received for Chinese Patent Application No. 201980047208.X, mailed on Aug. 25, 2021, 26 pages (15 pages of English Translation and 11 pages of Original Document).

International Search Report and Written Opinion dated Sep. 5, 2019, directed to International Application No. PCT/GB2019/051630; 12 pages.

Search Report dated Jan. 25, 2019, directed to GB Application No. 1812785.2; 2 pages.

Office Action received for Chinese Patent Application No. 201980047208.X, mailed on Apr. 20, 2022, 24 pages (14 pages of English Translation and 10 pages of Original Document).

Office Action received for Japanese Patent Application No. 2021-505736, mailed on May 10, 2022, 11 pages (6 pages of English Translation and 5 pages of Original Document).

* cited by examiner

MOBILE ROBOT AND METHOD OF CONTROLLING THEREOF

REFERENCE TO RELATED APPLICATIONS

This application is a national phase application under 35 USC 371 of International Application No. PCT/GB2019/051630, filed Jun. 12, 2019, which claims the priority of United Kingdom Application No. 1812785.2, filed Aug. 6, 2018, the entire contents of each of which are incorporated herein by reference.

FIELD OF THE DISCLOSURE

The present invention relates to a method of controlling a mobile robot, and in particular to hazard avoidance.

BACKGROUND OF THE DISCLOSURE

Mobile robots are becoming increasingly commonplace and are used in such diverse fields as space exploration, telepresence, home assistance, lawn mowing and floor cleaning. Recently there has been a rapid advancement in the field of domestic robots, the primary objective of which is to navigate a user's home autonomously and unobtrusively carrying out operations such as vacuuming and cleaning, whilst requiring as little assistance from a human user as possible and preferably none.

In performing such tasks, mobile robots must be able to autonomously navigate and negotiate obstacles within their environment. In order that the mobile robot is able to carry out all operations expected of it to the highest standard possible, it is also important that the mobile robot is able to navigate through as much of the available space within the environment in which it is located. This is often referred to as coverage. For instance, for a robotic vacuum cleaner floor coverage is important to ensure a maximum amount of the floor surface is cleaned autonomously.

In order to maximise coverage, it is desirable to increase the manoeuvrability of the mobile robot over small obstacles. For example, if there is a slight difference in height of a floor surface at a transition from a hard floor surface to a carpet or rug, it is beneficial that the mobile robot is able to manoeuvre over this transition in order that both areas of floor surface can be cleaned. However, in increasing the manoeuvrability of a mobile robot over obstacles, this also increases the possibility that the mobile robot can encounter problems such as getting stuck on an obstacle when attempting to climb over it, or navigating into an area from which the mobile robot is not able to escape. These types of problem events can be considered hazards to the mobile robot. These kinds of hazards can be particularly frustrating to users and owners of mobile robots as it requires human intervention in order to recover the mobile robot before it is able to continue.

Accordingly, improvements to mobile robots are required that help to maximise mobile robot coverage, while minimising the risk of the mobile robot experiencing hazards as it navigates an environment.

SUMMARY OF THE DISCLOSURE

According to various embodiments, this invention provides a method of controlling a mobile robot capable of carrying out an operation within an environment, the method comprising: storing an environment map in a memory, the environment map including data to enable the robot to navigate the environment; further storing in the memory data corresponding to one or more hazard areas encountered by the mobile robot during previous operations; and reducing a tilt threshold of the robot when the mobile robot is navigating within an area of the environment that corresponds to a previously encountered hazard area.

As a result, the mobile robot will be controlled in a way such that it continues to push its manoeuvring capabilities and therefore the coverage of the mobile robot will be maximised. However in areas where the mobile robot has experienced hazards previously, the mobile robot will behave more cautiously by reducing the tilt-threshold, and will reduce the likelihood that it experiences the hazard again. Crucially, the reduced tilt threshold will only be applied in areas of the environment map where the mobile robot determines it could be at risk, and therefore coverage can be maximised whilst also reducing the risk of the mobile robot experiencing hazards.

The data corresponding to one or more hazard areas may be location data. The data corresponding to one or more hazard areas may be stored as a layer on top of the environment map. As a result, the location of hazard areas can be more easily mapped within the environment map, and without requiring a second full map for hazard areas. This may reduce the amount of data needed to be stored, and may also reduce the amount of processing required from the control system on the mobile robot.

A hazard area may be an area in which the mobile robot has experienced a hazard event. A hazard event may comprise the mobile robot becoming stuck, or a hazard event may comprise the mobile robot experiencing an over-tilt threshold event. As a result, the mobile robot will reduce the tilt-threshold in areas where it has become stuck or over-tilted previously, and will navigate these areas more cautiously when navigating these areas in operations.

The memory may be on-board memory on the robot. As a result, the mobile robot is able to navigate the environment, and continue to be controlled in the advantageous ways described above even if it loses a connection to a network, for example if the mobile robot navigates into an area of the environment in which a wireless network does not extend.

A hazard area may be an area of predetermined size the centre of which is a location where a hazard was encountered. As a result, the mobile robot will adjust its behaviour to be more cautious in an area surrounding the hazard. This allows for there to be some margin for error in the robot's localisation, or for slight movement of problem obstacles within the environment. For example a bar stool with a curved base which causes the mobile robot difficulty may not be replaced in the exact same position after every time it is used.

A method of controlling a mobile robot as claimed in claim 9, wherein the area of predetermined size is a circle with a radius of between 0.1 m and 0.5 m. This size area has been found to be particularly beneficial in balancing extending coverage and reducing the risk of the mobile robot experiencing hazards.

The method may further comprise updating the data corresponding to one or more hazard areas when a new hazard is encountered by the mobile robot during an operation. As a result, new hazards within an environment, for example those that are created by the introduction of new obstacles into the environment can be taken into consideration for future operations.

The data corresponding to one or more hazard areas may comprise a probability factor associated with each hazard area, and the method may comprise reducing the probability factor for a particular hazard area when the mobile robot navigates through the particular hazard area without encountering a further hazard. As a result, if hazards are removed from an environment, for example by the removal of furniture, then the data corresponding to the corresponding hazard areas can be removed over time. This means that the mobile robot does not have to continue to behave cautiously in an area where the hazard has been removed. This in turn can help to improve coverage of the mobile robot.

The tilt threshold of the robot may only be reduced when the mobile robot is navigating within an area of the environment that corresponds to a previously encountered hazard area having a probability factor above a predetermined threshold. As a result, if a hazard is removed, then it can effectively be removed from the data corresponding to one or more hazard areas over time and the mobile robot can ignore any old hazard areas which no longer contain a hazard.

The method may comprise measuring the tilt of the mobile robot while it carries out an operation in an environment using one or more of the list comprising a gryo, an IMU and an accelerometer. As a result, the on board components are able to instantly provide an accurate tilt measurement to the control system of the mobile robot, and this can help the mobile robot quickly identify when it may have encountered a hazard to allow it the best opportunity to resolve the problem itself without requiring intervention from a human.

This invention further provides a mobile robot capable of carrying out an operation within an environment, the mobile robot comprising: storage in memory for storing an environment map; storage in memory for storing data corresponding to one or more hazard areas encountered by the mobile robot during previous operations; a control system for controlling the mobile robot while carrying out an operation within the environment, wherein the control system is configured to use a first tilt threshold in controlling the mobile robot in a normal operation mode, and is configured to use a second tilt threshold in controlling the mobile robot in a cautious operation mode when the mobile robot is navigating within a hazard area.

As a result, the manoeuvring capabilities of the mobile robot can be pushed where possible, and the coverage of the mobile robot will be maximised. However in areas where the mobile robot has experienced hazards previously, the mobile robot will behave more cautiously by reducing the tilt-threshold, and will reduce the likelihood that it experiences the hazard again. Crucially, the reduced tilt threshold will only be applied in areas of the environment map where the mobile robot determines it could be at risk, and therefore coverage can be maximised whilst also reducing the risk of the mobile robot experiencing hazards.

The second tilt threshold may be less than the first tilt threshold. As a result, the mobile robot will be able to react more quickly to events where the tilt of the robot changes. This in turn can allow it to behave more cautiously in areas where it has experienced hazards during previous operations within the environment.

The data corresponding to hazard areas may be stored as a layer on top of the environment map. As a result, a separate map for hazard areas is not required, and this may reduce the amount of data needed to be stored, and may also reduce the amount of processing required to be carried out by the mobile robot.

The control system may be configured to update the data corresponding to hazard areas when a new hazard is encountered by the mobile robot as it carries out an operation in the environment. As a result, the mobile robot will then be able to behave cautiously around the new hazard the next time it performs n operation in the environment. New hazards could be, for example, those that are created by the introduction of new obstacles into the environment, can be taken into consideration for future operations.

The data corresponding to hazard areas may comprise a probability factor associated with each hazard area, and the control system may be configured to reduce the probability factor for a particular hazard area when the mobile robot navigates through the particular hazard area without encountering a further hazard. As a result, if hazards are removed from an environment, for example by the removal of furniture, then the data corresponding to the corresponding hazard areas can be removed over time. This means that the mobile robot does not have to continue to behave cautiously in an area where the hazard has been removed. This in turn can help to improve coverage of the mobile robot.

The mobile robot may comprise one or more of a gryo, an IMU and an accelerometer to provide a tilt measurement corresponding to the current tilt of the robot to the control system. As a result, the on board components of the mobile robot are able to instantly provide an accurate tilt measurement to the control system of the mobile robot, and this can help the mobile robot quickly identify when it may have encountered a hazard to allow it the best opportunity to resolve the problem itself without requiring intervention from a human.

BRIEF DESCRIPTION OF THE FIGURES

In order that the present invention may be more readily understood, embodiments of the invention will now be described, by way of example, with reference to the following accompanying drawings, in which.

DETAILED DESCRIPTION OF THE DISCLOSURE

Figure 1:
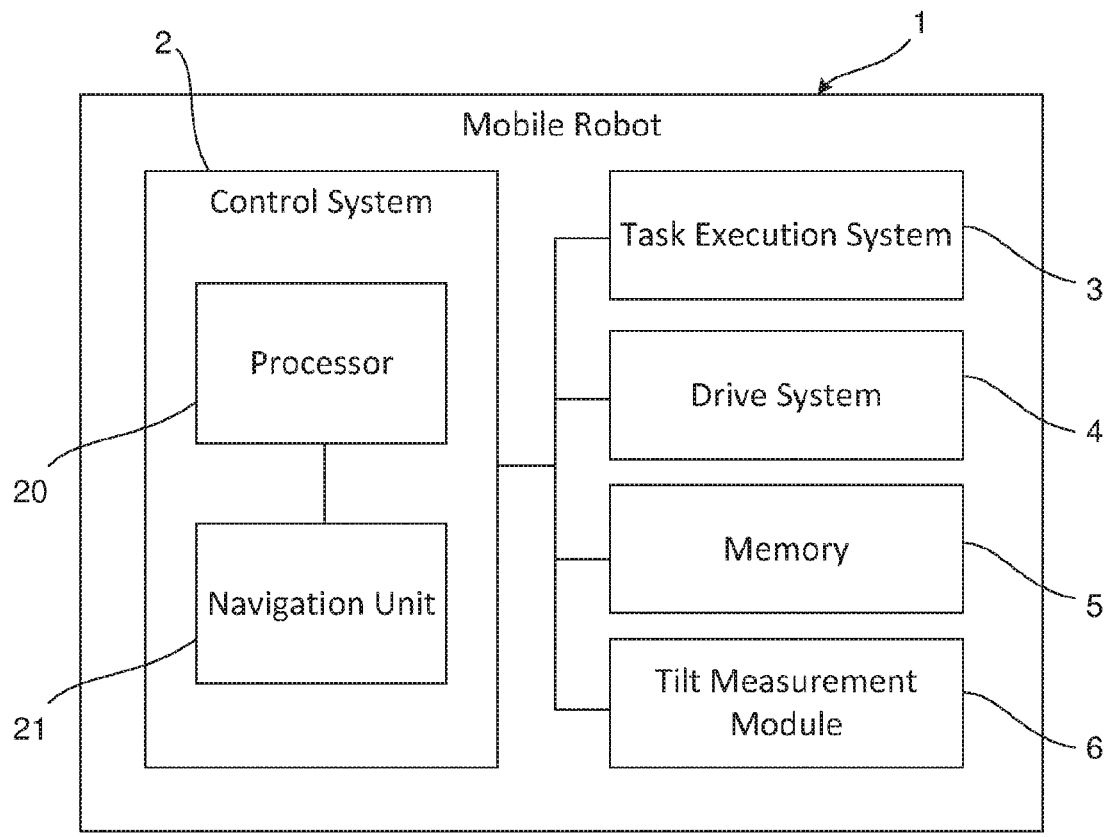
FIG. 1 is a schematic representation of a mobile robot.

The mobile robot 1 schematically illustrated in FIG. 1 has a control system 2, a task execution system 3, a drive system 4, memory 5, and a tilt measurement module 6. The control system 2 comprises a processor 20 and a navigation unit 21.

Figure 3:
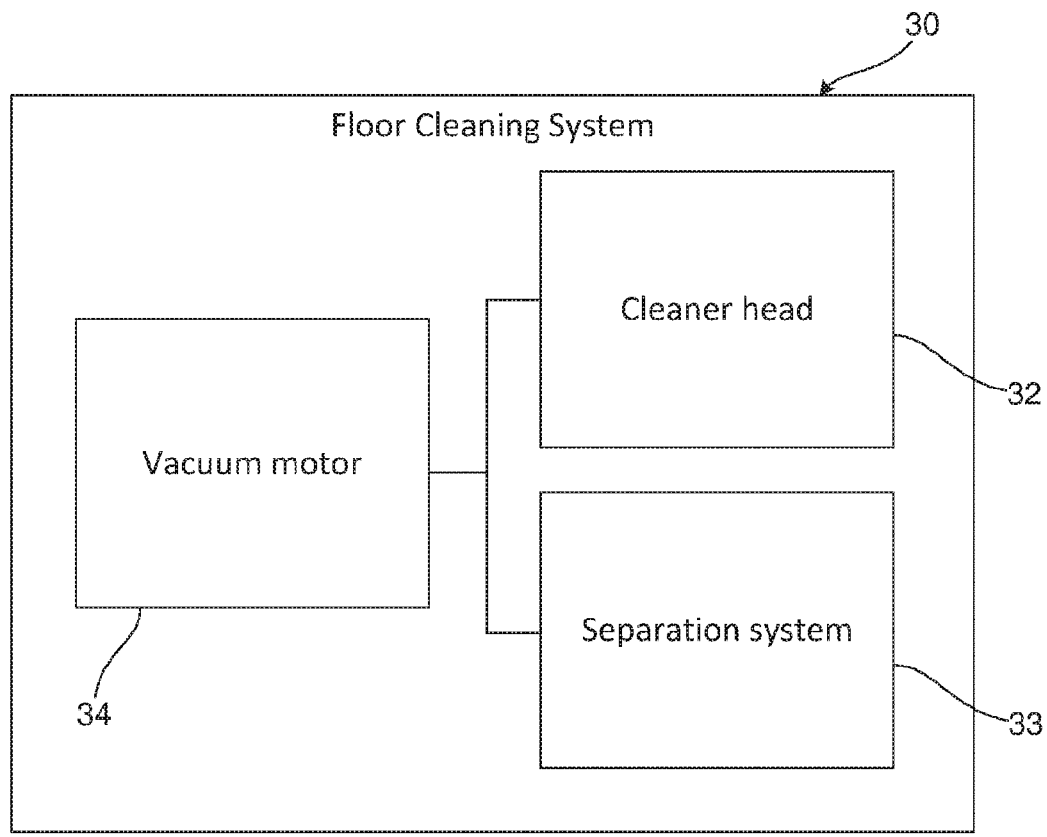
FIG. 3 is a schematic representation of a floor cleaning system.

The task execution system 3 is the system provided to the mobile robot for carrying out tasks or operations assigned to the mobile robot. For example, the mobile robot 1 may be a robotic lawn mower in which instance the task execution system 3 could be a grass cutting and/or collection system. In a further example, the mobile robot 1 may be a robotic floor cleaner, and the task execution system 3 would be floor cleaning system. A schematic representation of such a floor cleaning system 30 is shown in FIG. 3. The floor cleaning system 30 comprises a cleaner head 32, a separation system 33 and a vacuum motor 34. These features of the floor cleaning system are ordinary features of a floor cleaning system, and no further explanation of these systems will be provided here. Other examples of task execution systems will be apparent.

Figure 2:
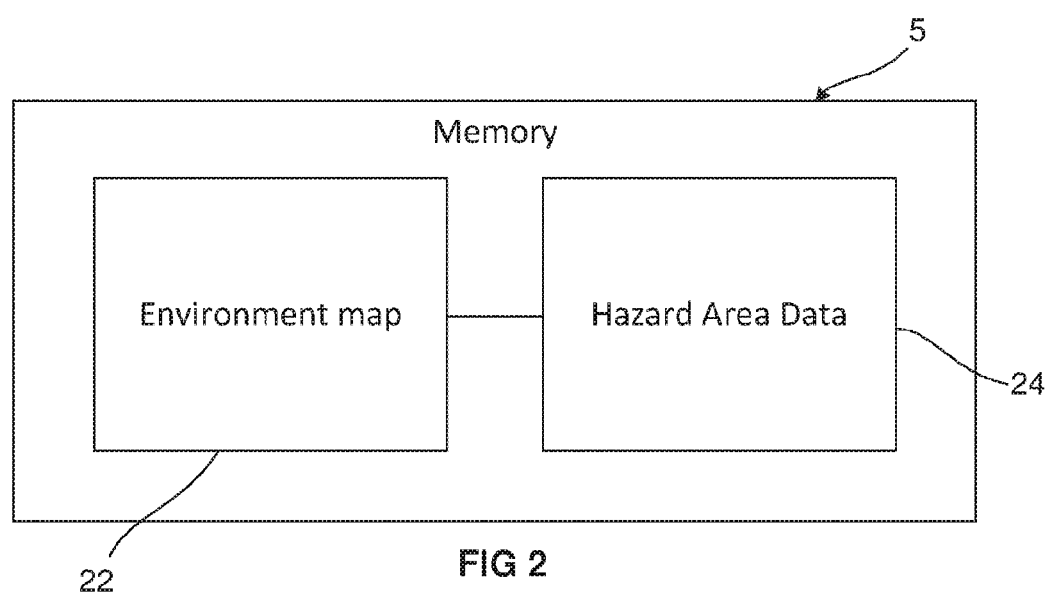
FIG. 2 is a schematic representation of the memory of the mobile robot of FIG. 1.
Figure 4:
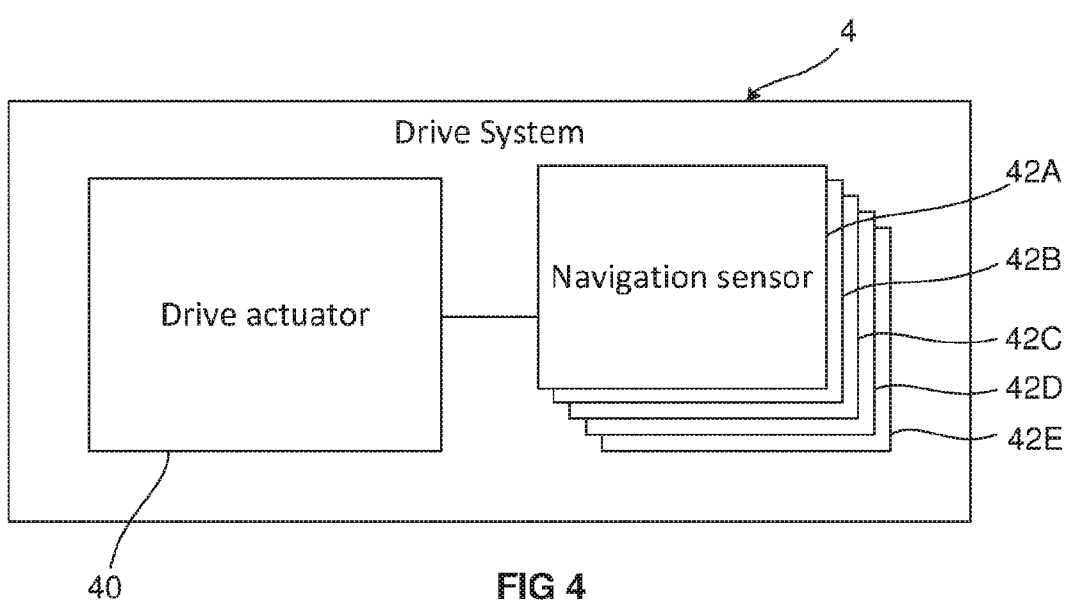
FIG. 4 is a schematic representation of a drive system.

The navigation unit 21 together with the drive system 4 enable the mobile robot to manoeuvre and navigate around an environment in which it must carry out an operation. A schematic representation of a drive system is provided in FIG. 4. The drive system 4 is provided with a drive actuator 40 and a number of navigation sensors 42A-E. The drive actuator 40 may be, for example, driven wheels or tank tracks, and is able to provide odometry measurements to the control system 2 of the mobile robot 1. These odometry measurements can be used by the control system 2, and in particular the navigation unit 21 to estimate the distance and path travelled by the mobile robot 1. The navigation sensors 42A-E are sensors that are able to provide information to the control system 2 about the environment around the mobile robot 1. For example navigation sensor 42A may be a vision camera, and navigation sensors 42B and 42C may be proximity sensors such as Time of Flight (TOF) sensors, and navigation sensors 42D and 42E may be drop sensors or cliff sensors. Other navigation sensors could be used in addition or as an alternative to these sensors. For example, the mobile robot 1 may comprise a laser range finder. In alternative embodiments, the navigation sensors 42A-E may form part of the navigation unit 21 of the mobile robot 1. The mobile robot 1 will typically use a number of different types of navigation sensor in order to be able to autonomously navigate an environment more successfully. The navigation sensors 42A-E provide information to the control system 2 about the environment around the robot 1 that enables the control system 2 to build up a map of the environment that can be used by the mobile robot 1 to navigate. This environment map can be stored in the memory 5 of the mobile robot 1. FIG. 2 shows a representation of the memory 5 of mobile robot 1. The memory 5 is shown containing the environment map 22. Hazard area data 24 is also stored in memory 20. The hazard area data is data corresponding to areas within the environment map which contain hazards that the mobile robot has come across during previous operation within the environment. Hazards may be, for example where the robot has become stuck on an obstacle, or has experienced an over-tilt threshold event.

The mobile robot 1 has a tilt measurement module. This module provides a measurement of the current tilt of the mobile robot 1 to the control system 2. The control system 2 can often determine if the robot is experiencing a hazard or problem if the tilt of the robot changes significantly. For example, if the mobile robot 1 attempts to climb over an obstacle on which it may become stuck, then the tilt measurement module will record the change in tilt of the mobile robot 1 as it starts to manoeuvre over it. Tilt measurements can be provided by one or more of a number of components within the tilt measurement module. These components may be one or more of a gyrometer or gyroscope (gyro), an inertial measurement unit (IMU), and an accelerometer. A tilt threshold can be set such that if the mobile robot's pose changes such that the tilt of the mobile robot exceeds the tilt threshold, then actions can be taken to avoid the hazard from causing an error that the robot is unable to resolve by itself. By monitoring the tilt of the robot, the control system can react to hazard events, and can act to avoid the hazard from occurring in a way that requires human intervention to resolve the problem. For example, on determining that the tilt threshold has been exceeded, the control system 2 may control the drive system to stop and reverse such that the mobile robot 1 does not continue further into the hazard.

The hazard area data 24 is location data that allows the navigation unit 21 in the control system 2 to determine where within the environment map 22 the hazard areas are, and also if the mobile robot 1 enters a hazard area. The control system can then be configured to adjust the behaviour of the robot to avoid experiencing the hazard again. It could be possible to avoid the area altogether, however this would have a negative impact on the coverage of the robot. Instead, the robot's behaviour can be adjusted by reducing the tilt threshold of the mobile robot 1 while it is within a hazard area. This effectively causes the mobile robot 1 to behave more cautiously. Therefore, adopting a lower tilt threshold can be considered to be running the mobile robot in a cautious operation mode. This will be explained in more detail later in respect to FIG. 7B.

Figure 5:
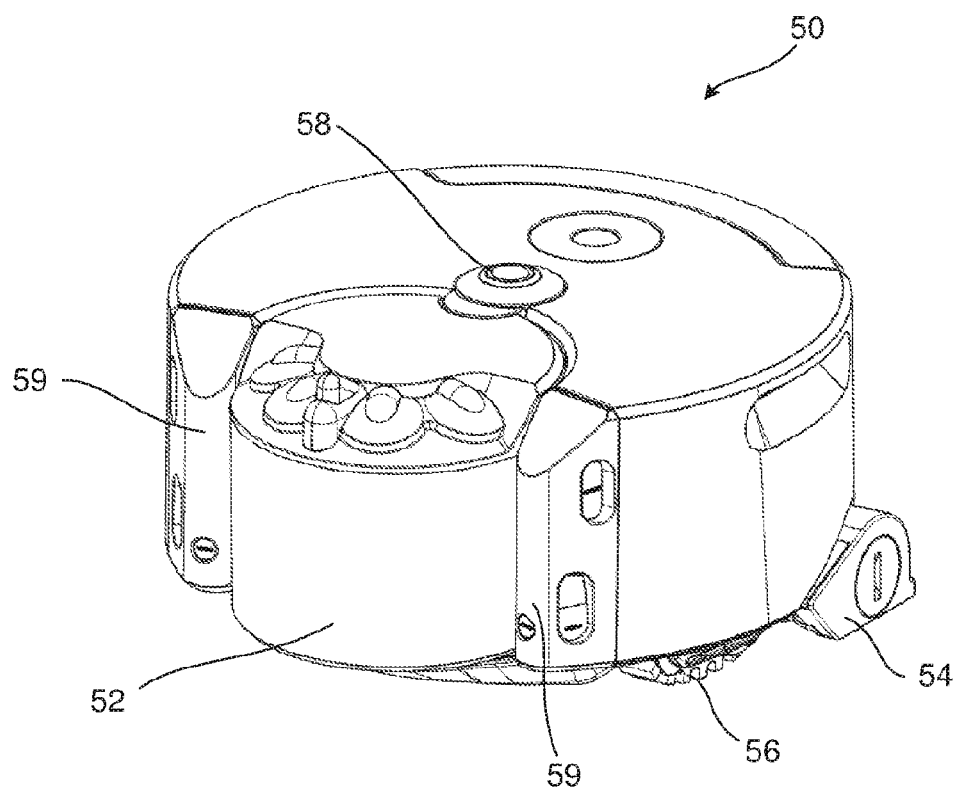
FIG. 5 is a robot vacuum cleaner.

FIG. 5 shows an example of a mobile robot. The mobile robot is a robotic vacuum cleaner 50 and has a floor cleaning system comprising a cyclonic separating system 52 and a cleaner head 54. A vacuum motor (not shown) provided inside the main body of the robot vacuum cleaner 50 draws dirty air in from the cleaner head 54, through the cyclonic separator 52 where the dirt particles are removed from the airflow, and then expels the clean air through a vent (not shown) in the back of the robot. The robot vacuum cleaner 50 has drive actuators in the form of tank tracks 56 which can be driven to move the robotic vacuum cleaner 50 around an environment in which it is located. The robot vacuum cleaner 50 has a navigation sensor comprising a fish-eye lens camera 58 which is able to capture images of the area around the robot vacuum cleaner 50. The robot's control system uses Simultaneous Localisation and Mapping (SLAM) techniques on the images captured by the camera 58 in order to build a map of the environment and to identify the position of the robot within that map. The SLAM techniques carried out by the control system also use odometry measurements provided from the driven tank tracks, and also information provided from other sensors, such as proximity sensors, located in the sensor housings 59 positioned either side of the cyclonic separator 52.

Figure 6:
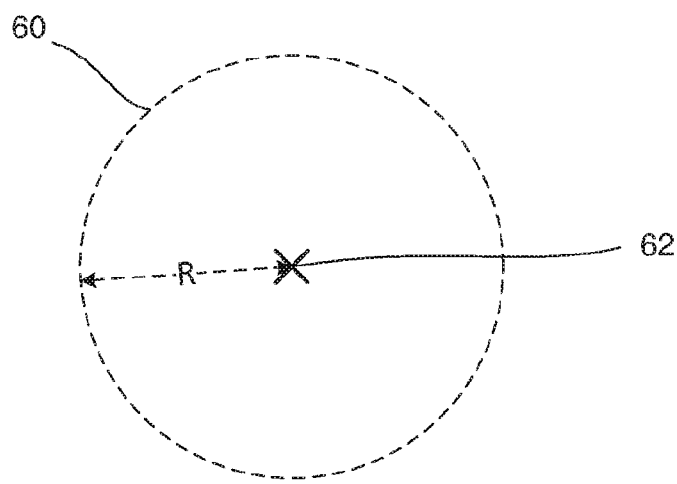
FIG. 6 is representation of a hazard area.

FIG. 6 shows a representation of a hazard area 60. At the centre of the hazard area 60 is a point marked with a cross referenced 62. This point is the exact location where a mobile robot has experienced a hazard. Experiencing a hazard can be, for example encountering an error caused by an obstacle or similar located within the environment. For example, the error may be that the mobile robot has manoeuvred itself onto an obstacle in such a way that its drive actuators a no longer able to make effective contact with the floor surface. This could be referred to a being "beached" on the obstacle. Such an error will require human intervention in order to resolve the error, and allow the robot to continue with the operation. However experiencing a hazard may not necessarily give rise to an error in this way, and may be that the robot detects that it is finding itself in a situation which causes it difficulty in resuming the operation normally. For example, if the robot experiences an over-tilt threshold event, this can be an indication that there is a situation that is likely to cause an error even if the robot does not actually experience the error. It would therefore be prudent for the mobile robot to be more cautious wen navigating in this area of the environment in future.

The hazard area 60 shown in FIG. 6 is determined by marking a circular area with a predetermined radius R, the centre of which is the exact location where the mobile robot experienced the hazard. In the embodiment shown in FIG. 6, the hazard area is a circle of predetermined radius. However, it will be appreciated that alternative shapes may be adopted. A radius of between 0.1 m and 0.5 m for the hazard area has been found to be particularly beneficial to allow the robot to behave cautiously in the desired area of the map and to allow for slight tolerances and errors in the navigation system of the mobile robot. The example described above is an embodiment where the radius of the hazard area is a fixed predetermined radius. However, it will also be appreciated that the size of the hazard area may not be fixed, and may be dependent on other factors.

Figure 7A:
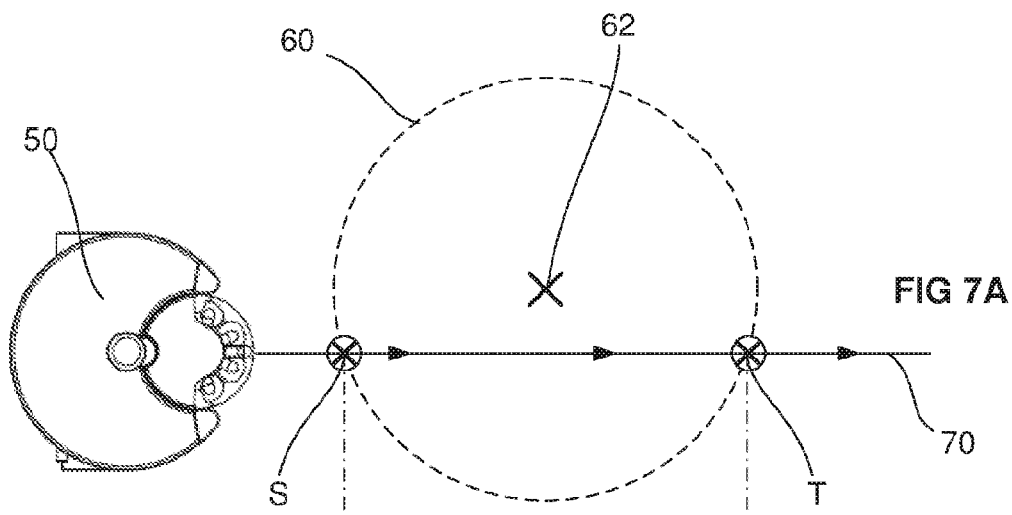
FIG. 7A shows the path of a mobile robot through the hazard area of FIG. 6.
Figure 7B:
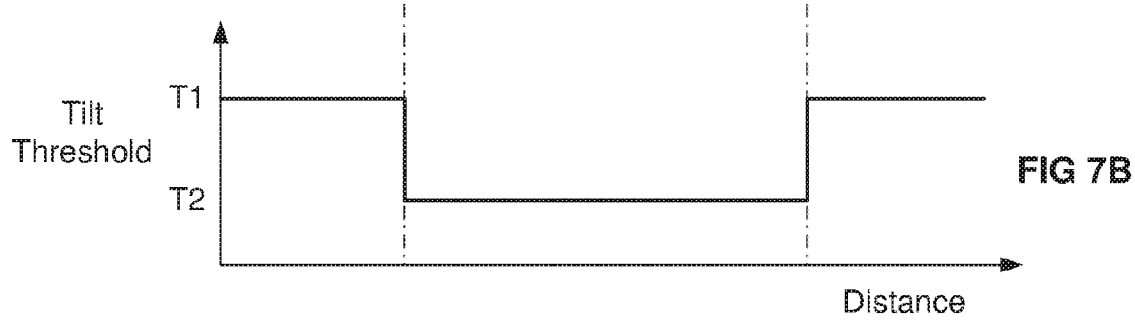
FIG. 7B is a graph showing the tilt threshold being used by the mobile robot while it travels along the path shown in FIG. 7A.

FIG. 7A shows a mobile robot 50 travelling on a path 70 which passes through the hazard area 60. FIG. 7B shows a graph indicating the tilt threshold that is being adopted by the control system of the mobile robot as it travels along the travel path 70. The mobile robot 50 enters the hazard area 60 at the point marked S. The dotted and dashed lines extending between FIGS. 7A and 7B indicate corresponding points between the travel path 70 of FIG. 7A and the graph of FIG. 7B. Prior to point S, the control system of the mobile robot 50 is controlled by its control system in a normal operation mode using a first tilt threshold T1 while controlling the mobile robot 50. Once the mobile robot 50 enters the hazard area at point S, the control system of the mobile robot 50 adopts a lower tilt threshold T2. This lower tilt threshold T2 is used while the robot is navigating through the hazard area 60. By adopting the lower tilt threshold T2, this means that the mobile robot 50 adopts a cautious operation mode in which it will react quicker to when the robot is experiencing a hazard, and the likelihood of the hazard causing an error is greatly reduced. When the mobile robot 50 reaches the other boundary of the hazard area 60 at the point marked T, the tilt threshold returns back to the higher threshold T1, and the mobile robot 50 returns to a normal operation mode.

Figure 8:
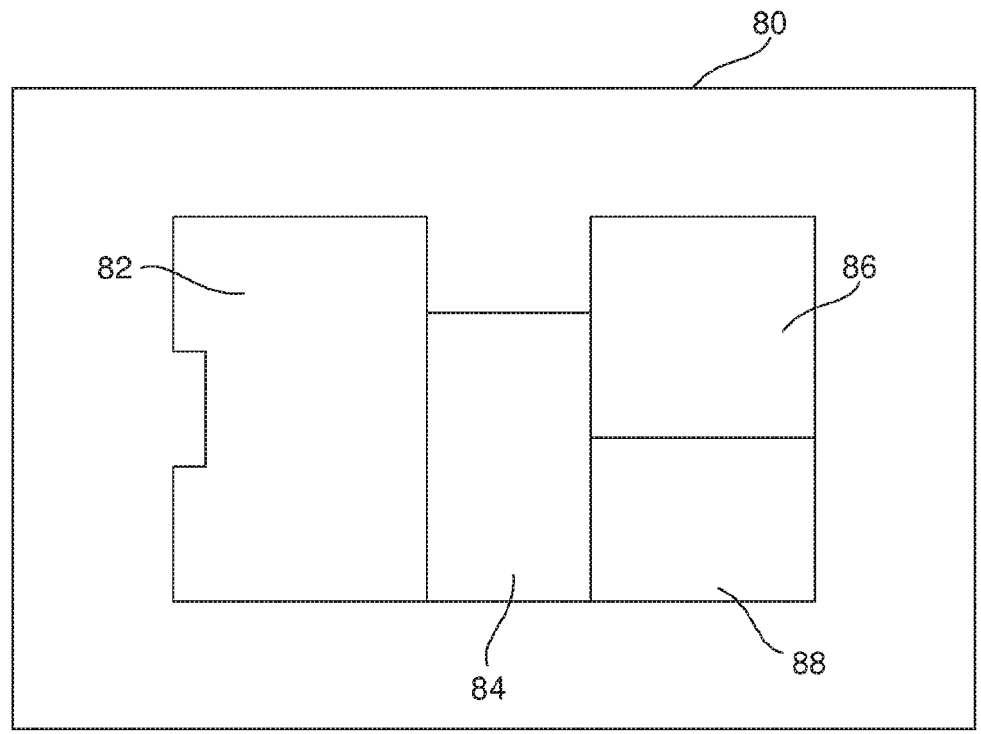
FIG. 8 shows an environment map.

As already described earlier, the mobile robot generates and stores an environment map in its memory. The mobile robot is able to triangulate its position within the environment map, and is therefore able to use the map to help it navigate around the environment. FIG. 8 shows an example of an environment map 80. A number of separate areas 82, 84, 86, 88 are shown in the environment map 80 and may represent, for example rooms within a house. The environment map 80 shown in FIG. 8 is a simplistic representation. However, it will be appreciated that the environment map 80 may include data pertaining to other aspects of the environment, for example the location of furniture, the location of doorways, information on the floor surface type etc.

Figure 9:
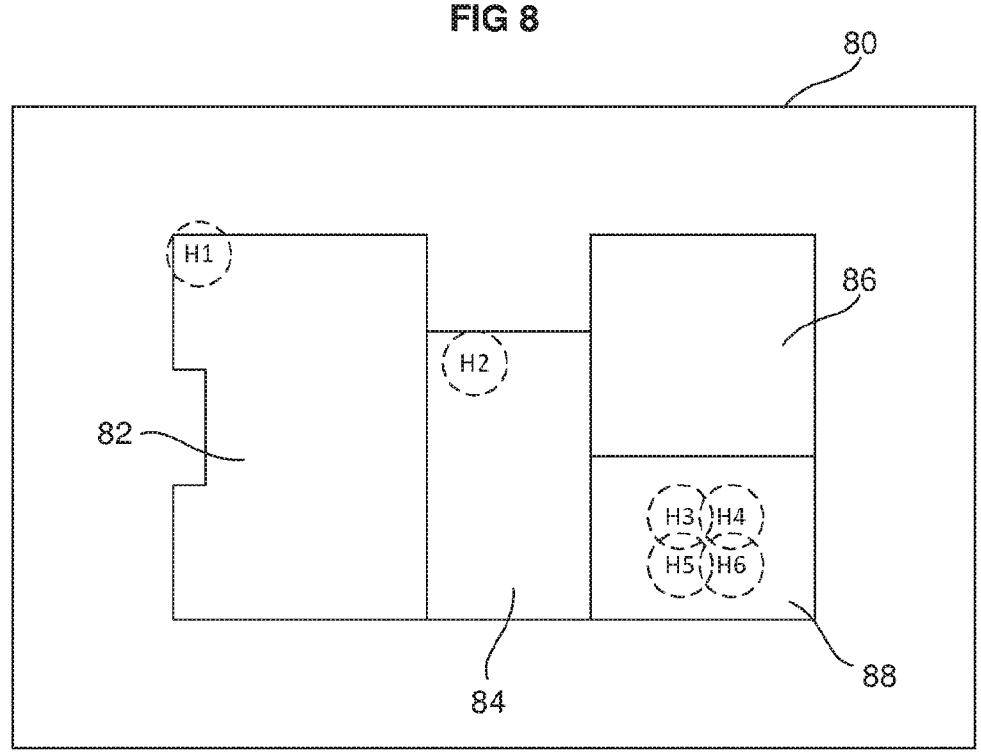
FIG. 9 shows the environment map of FIG. 8 and a map layer showing known hazard areas within the environment.

FIG. 9 show the environment map 80 of FIG. 8, but with an additional map layer applied overlaying the map which shows the location of the hazard areas found within the environment. These hazard areas are represented as the dotted circles labelled H1-H6. The nature of the hazard is not obvious from the environment map view. However, further data may be stored which allows the mobile robot to determine the type of hazard. This could, for example be stored in a look-up table or similar, or could be stored as metadata associated with the hazard area data stored in the memory of the robot. Room 82 has one hazard area H1 which is located in the corner of the room, room 84 has one hazard area H2, room 86 has no hazard areas associated with it, and room 88 has four hazard areas H3, H4, H5, H6 associated with it. Hazard areas H3, H4, H5 and H6 are shown overlapping, and may correspond, for example, to a set of chairs that cause the mobile robot difficulty when navigating around their chair legs or bases.

The hazard area data is overlaid as a map layer in FIG. 9. However, the hazard area data may be stored in other ways such as in a look-up table as shown in Table 1 below.

TABLE 1

| Hazard Area | Location Data | Probability Factor |
|---|---|---|
| H1 | [LOC1] | 80% |
| H2 | [LOC2] | 40% |
| H3 | [LOC3] | 100% |
| H4 | [LOC4] | 100% |
| H5 | [LOC5] | 100% |
| H6 | [LOC6] | 100% |

In Table 1, each of the hazard areas of FIG. 9 are shown as an entry in the table, with each hazard area entry having corresponding location data, represented by [LOC1]-[LOC6], which enables the mobile robot to determine when the mobile robot is navigating through a hazard area.

Also shown in Table 1 is a probability factor associated with each hazard area. This probability factor enables hazard areas to be effectively removed from the hazard area data if the corresponding hazards are removed from the environment. It will be understood that there are a number of ways in which this can be achieved, one of which will now be described. Each hazard as it is identified by the mobile robot as it navigates an environment is assigned a hazard area as previously described. A probability factor is also associated with each new hazard area, and for newly identified hazard areas this probability factor is set to 100%. When the mobile robot is next navigating in the area, if it passes through a known hazard area without experiencing the hazard again, then the corresponding probability factor for the hazard area is reduced by a predetermined amount, for example 5%. In one embodiment, once the probability factor of a hazard area drops below a threshold level, for example 10%, then the hazard area is deleted from the hazard area data. Alternatively, it may be desirable to maintain historical data, and rather than delete the data, the control system of the mobile robot may be configured to ignore any hazard areas that have a corresponding probability factor below a certain level. The tilt thresholds adopted by the mobile robot within each hazard area may also be relative to the probability factor associated with each hazard area.

This allows for dynamic hazard area data, and also a dynamic hazard area map which can update over time. It will be appreciated that the parameters detailed above can be adjusted to change how dynamic the data is, and how quickly it can be changed.

Whilst particular examples and embodiments have thus far been described, it will be understood that various modifications, some of which are already described above, may be made without departing from the scope of the invention as defined by the claims.

The invention claimed is:

1. A method of control for a mobile robot capable of carrying out an operation within an environment, the method comprising:
   storing an environment map in a memory, the environment map including data to enable the robot to navigate the environment;
   further storing in the memory data corresponding to one or more hazard areas encountered by the mobile robot during previous operations; and utilizing the stored environment map and the stored one or more hazard areas to automatically reduce a tilt threshold of the robot when the mobile robot is navigating within an area of the environment that corresponds to a previously encountered hazard area, resulting in the mobile robot navigating in a cautious mode within the area of the environment that corresponds to the previously encountered hazard area;

wherein a tilt threshold is an amount of tilt of the mobile robot that automatically triggers an action by the mobile robot to avoid a hazard.

2. The method of claim 1, wherein the data corresponding to one or more hazard areas is location data.

3. The method of claim 1, wherein the data corresponding to one or more hazard areas is stored as a layer on top of the environment map.

4. The method of claim 1, wherein a hazard area is an area in which the mobile robot has experienced a hazard event.

5. The method of claim 4, wherein a hazard event comprises the mobile robot becoming stuck.

6. The method of claim 4, wherein a hazard event comprises the mobile robot experiencing an over-tilt threshold event.

7. The method of claim 1, wherein the memory is on-board memory on the robot.

8. The method of claim 1, wherein a hazard area is an area of predetermined size the centre of which is a location where a hazard was encountered.

9. The method of claim 8, wherein the area of predetermined size is a circle with a radius of between 0.1 m and 0.5 m.

10. The method of claim 1, wherein the method further comprises updating the data corresponding to one or more hazard areas when a new hazard is encountered by the mobile robot during an operation.

11. The method of claim 1, wherein the data corresponding to one or more hazard areas comprises a probability factor associated with each hazard area, and the method comprises reducing the probability factor for a particular hazard area when the mobile robot navigates through the particular hazard area without encountering a further hazard.

12. The method of claim 11, wherein the tilt threshold of the robot is only reduced when the mobile robot is navigating within an area of the environment that corresponds to a previously encountered hazard area having a probability factor above a predetermined threshold.

13. The method of claim 1, wherein the method comprises measuring the tilt of the mobile robot while the mobile robot carries out an operation in an environment using at least one selected from the group consisting of a gyro, an IMU and an accelerometer.

14. A mobile robot capable of carrying out an operation within an environment, the mobile robot comprising:
storage in memory for storing an environment map;
storage in memory for storing data corresponding to one or more hazard areas encountered by the mobile robot during previous operations; and
a control system for controlling the mobile robot while carrying out an operation within the environment,
wherein the control system is configured to use a first tilt threshold when controlling the mobile robot in a normal operation mode, and is configured to use a second tilt threshold when controlling the mobile robot in a cautious operation mode when the mobile robot is navigating within a hazard area; and
wherein the control system operably utilizes the stored environment map and stored one or more hazard areas to automatically switch to the second tilt threshold from the first tilt threshold, resulting in the mobile robot navigating in the cautious operation mode; and
wherein a tilt threshold is an amount of tilt of the mobile robot that automatically triggers an action by the mobile robot to avoid a hazard.

15. The mobile robot of claim 14, wherein the second tilt threshold is less than the first tilt threshold.

16. The mobile robot of claim 14, wherein the data corresponding to hazard areas is stored as a layer on top of the environment map.

17. The mobile robot of claim 14, wherein the control system is configured to update the data corresponding to hazard areas when a new hazard is encountered by the mobile robot as it carries out an operation in the environment.

18. The mobile robot of claim 14, wherein the data corresponding to hazard areas comprises a probability factor associated with each hazard area, and the control system is configured to reduce the probability factor for a particular hazard area when the mobile robot navigates through the particular hazard area without encountering a further hazard.

19. The mobile robot of claim 18, wherein the control system is configured to only use the second tilt threshold when the mobile robot is navigating within an area of the environment that corresponds to a previously encountered hazard area having a probability factor above a predetermined threshold.

20. The mobile robot of claim 14, wherein the mobile robot comprises at least one selected from the group consisting of a gyro, an IMU and an accelerometer to provide a tilt measurement corresponding to the current tilt of the robot to the control system.

\* \* \* \* \*